United States Patent
Iwami

(10) Patent No.: US 6,686,436 B2
(45) Date of Patent: Feb. 3, 2004

(54) SOLID GOLF BALL

(75) Inventor: Satoshi Iwami, Kobe (JP)

(73) Assignee: Sumitomo Rubber Industries Limited, Kobe (JP)

( * ) Notice: Subject to any disclaimer, the term of this patent is extended or adjusted under 35 U.S.C. 154(b) by 0 days.

(21) Appl. No.: 09/993,721

(22) Filed: Nov. 27, 2001

(65) Prior Publication Data

US 2002/0155905 A1 Oct. 24, 2002

(30) Foreign Application Priority Data

Dec. 28, 2000 (JP) ........................................ 2000-402501

(51) Int. Cl.[7] ............................................... A63B 37/12
(52) U.S. Cl. ............................ 528/63; 528/64; 473/378
(58) Field of Search ....................... 528/63, 64; 473/378

(56) References Cited

U.S. PATENT DOCUMENTS

| | | | |
|---|---|---|---|
| 5,334,673 A | | 8/1994 | Wu |
| 5,752,889 A | | 5/1998 | Yamagishi et al. |
| 6,117,024 A | * | 9/2000 | Dewanjee |
| 6,309,313 B1 | * | 10/2001 | Peter |
| 6,422,953 B1 | * | 7/2002 | Nesbitt et al. |
| 6,486,261 B1 | * | 11/2002 | Wu et al. |

FOREIGN PATENT DOCUMENTS

AU       199923581       * 10/1999

* cited by examiner

Primary Examiner—David J. Buttner
(74) Attorney, Agent, or Firm—Birch, Stewart, Kolasch & Birch, LLP

(57) ABSTRACT

There is provided a solid golf ball comprising a core and a cover made from polyurethane obtained by curing an isocyanate group-terminated urethane prepolymer including a residual polyisocyanate monomer content of not more than 0.1% by mass using an aromatic polyamine curing agent. The golf ball satisfies moldability of the polyurethane cover and durability, and exhibits excellent ball characteristic such as flight performance and shot feeling.

10 Claims, 1 Drawing Sheet

SOLID GOLF BALL

BACKGROUND OF THE INVENTION

1. Field of the Invention

The present invention relates to a multi-piece solid golf ball comprising a solid core and a polyurethane cover covering the core.

2. Description of the Related Art

A conventional solid golf ball having a solid core made from vulcanized rubber employs an ionomer resin cover because an ionomer resin cover exhibits superior durability. Golf balls with ionomer resin covers, however, give golfers a larger impact upon shot than golf balls with Balata rubber covers and hence are likely to impart inferior shot feeling to the golfers.

In attempt to improve the shot feeling imparted by golf balls with the ionomer covers, Japanese Patent No. 2709950, for example, has proposed a cover made from a mixture of a hard ionomer such as a sodium salt or zinc salt of an olefin-unsaturated carboxylic acid copolymer and a soft ionomer such as a sodium salt or zinc salt of an olefin-unsaturated carboxylic acid-unsaturated carboxylic acid ester terpolymer. The cover makes it possible to render the shot feeling soft due to the soft ionomer in the cover material, but on the other hand, impairs the merits inherent to ionomer covers; for example, the repulsion property as well as the scuff resistance of the golf ball lowers.

In recent years, polyurethane is receiving attention as an inexpensive cover material that imparts to golfers a shot feeling analogous to a shot feeling imparted by the Balata cover and has higher durability than the Balata cover. U.S. Pat. No. 5,334,673, for example, has disclosed a polyurethane cover formed by curing a urethane prepolymer with a slow-reactive polyamine curing agent. Also, Japanese Patent Laid-Open Gazette No. HEI 9-215778 has proposed a cover made from thermoplastic polyurethane.

Polyurethane used as a cover material involves a problem that it makes the molding of a cover difficult because the curing reaction between a urethane prepolymer and a polyamine proceeds rapidly, which causes a steep increase in viscosity. The U.S. Pat. No. 5,334,673 has solved the problem by the use of a slow-reactive polyamine and/or a glycol. In the art of the publication, however, there are some cases depending on kinds of urethane prepolymer, curing agent, and/or combinations thereof in which an increase in viscosity is still rapid and makes the molding of a cover difficult. Even though a polyurethane cover is obtained by molding, a golf ball with the resulting cover is not sufficient in terms of repulsion property, spin performance and scuff resistance. Thus, further improvements with respect to a thermosetting type polyurethane cover are desired.

Thermoplastic polyurethane elastomers used as cover materials are superior in moldability to thermosetting polyurethane, but covers made of thermoplastic polyurethane elastomers are inferior in wear resistance, tear strength and scuff resistance to covers made from thermosetting polyurethane or hard ionomer because the thermoplastic polyurethane elastomers lack three-dimensionally crosslinking points.

SUMMARY OF THE INVENTION

An object of the present invention is to provide a solid golf ball with a cover made from polyurethane which provides satisfactory moldability and ball characteristics.

A solid golf ball of the present invention comprises a solid core and a cover covering the solid core. The cover is made from polyurethane obtained by curing a composition comprising an isocyanate group-terminated urethane prepolymer and an aromatic polyamine compound. The isocyanate group-terminated urethane prepolymer has a residual polyisocyanate monomer content of not more than 0.1% by mass.

DETAILED DESCRIPTION OF THE PREFERRED EMBODIMENTS

Figure 1:
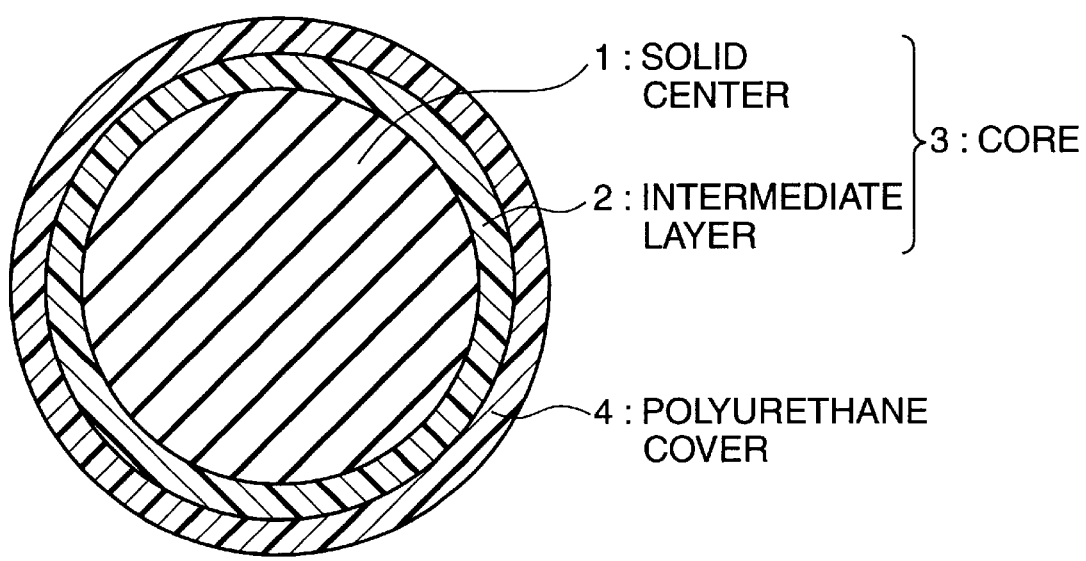
FIG. 1 is a schematic view showing the appearance of a golf ball according to the present invention.

The present invention will now be described in detail.

According to the solid golf ball of the present invention, as shown in FIG. 1, a solid core 1 is covered with a specific polyurethane cover 2. The core 1 is a vulcanized rubber sphere having one or more layers.

The polyurethane cover is formed by curing a composition comprising an aromatic polyamine curing agent and an isocyanate group-terminated urethane prepolymer. The isocyanate group-terminated urethane prepolymer contains a residual polyisocyanate monomer in an amount of not more than 0.1% by mass.

The "isocyanate group-terminated urethane prepolymer" of the invention means a urethane prepolymer has at least two isocyanate groups in its molecular chain. Each isocyanate group may be located at the terminal of the backbone chain of the molecular chain or at the terminal of a side chain of the urethane prepolymer. The isocyanate group-terminated urethane prepolymer is prepared by a reaction between a polyol and a polyisocyanate compound in a state where the isocyanate group of the polyisocyanate compound is excessive relative to the hydroxyl group of the polyol in molar ratio.

The "residual polyisocyanate monomer", as used herein, means an unreacted polyisocyanate compound remaining in the isocyanate group-terminated urethane prepolymer. The content of the residual polyisocyanate monomer in the isocyanate group-terminated urethane prepolymer is defined by the expression: (the mass of the residual polyisocyanate monomer/the mass of the isocyanate group-terminated urethane prepolymer including the residual polyisocyanate monomer and the like)×100 and can be determined by gas chromatography. If the content of the residual polyisocyanate monomer is more than 0.1% by mass, a precipitate is likely to occur in the urethane composition before finishing the curing reaction. Though the mechanism of occurrences of the precipitate is not clearly known, it can be presumed that the residual polyisocyanate monomer reacts with the polyamine curing agent to precipitate the reaction product. Such precipitation causes uneven reaction between the isocyanate group-terminated urethane prepolymer and the polyamine curing agent, resulting in a difficulty in the manufacture of a homogeneous polyurethane cover. A heterogeneous polyurethane cover has affected durability, particularly a lowered scuff resistance. Also it is difficult for a heterogeneous polyurethane cover in wet state to secure an appropriate spin rate. In an extreme case, the composition for a cover is cured before forming a cover, which makes the molding of the cover substantially impossible. Examples of the polyisocyanate compounds for use as raw materials of isocyanate group-terminated urethane prepolymers include, without any particular limitation, aromatic diisocyanates such as TDI (toluene 2,4-diisocyanate, toluene 2,6-diisocyanate, or a mixture thereof), MDI (4,4'-diphenylmethane diisocyanate or a polynuclear compound thereof), 1,5-naphthylene diisocyanate (NDI), 3,3'-bitolylene-4,4'-diisocyanate (TODI), xylylene diisocyanate (XDI) and paraphenylene diisocyanate (PPDI); and alicyclic diisocyanates or aliphatic diisocyanates such as 4,4'-dicyclohexylmethane diisocyanate (hydrogenated MDI), hexamethylene diisocyanate (HDI) and isophorone diisocyanate (IPDI), or mixtures of one or two or more of them. Among them, TDI or hydrogenated MDI is preferably used because a resulting polyurethane cover has favorable mechanical properties and a golf ball with the resulting polyurethane cover is satisfactory in repulsion property, weatherability and water resistance.

Any polyol having a plurality of hydroxyl groups may be used as a raw material of the isocyanate group-terminated urethane prepolymer regardless of whether it is a low-molecular-weight compound or a high-molecular-weight compound. Examples of the low-molecular-weight polyols include diols such as ethylene glycol, diethylene glycol, triethylene glycol, 1,3-butanediol, 1,4-butanediol, neopentyl glycol, and 1,6-hexanediol; and triols such as glycerin, trimethylolpropane, and hexanetriol. Examples of the high-molecular-weight polyols include polyether polyols generally resulting from the reaction between an initiator having active hydrogen and alkylene oxide; condensed polyester polyols generally resulting from the dehydro-condensation between a dibasic acid such as adipic acid, and a glycol or a triol; lactone polyester polyols generally resulting from ring opening polymerization of a lactam such as ε-caprolactam; polycarbonate diols generally synthesized using a cyclic diol; and polymer polyols such as an acrylic polyol prepared by introducing an appropriate hydroxyl group into an acrylic copolymer. Examples of specific polyether polyols include polyoxyethylene glycol, polyoxypropylene glycol (PPG), and polyoxytetramethylene ether glycol (PTMG). Examples of specific condensed polyester polyols include polyethylene adipate (PEA), polybutylene adipate (PBA), and polyhexamethylene adipate (PHMA). Examples of specific lactone polyester polyols include poly-ε-caprolactone (PCL). In view of their superior repulsion property and water resistance, polyether polyols are preferable. Use of polyoxytetramethylene ether glycol is particularly preferable.

Accordingly, one selected from the group consisting of a TDI-type urethane prepolymer, an MDI-type urethane prepolymer and a hydrogenated MDI-type urethane prepolymer is preferably used as the isocyanate group-terminated urethane prepolymer. Specifically, use of a TDI-type urethane prepolymer, an MDI-type urethane prepolymer, a hydrogenated MDI-type urethane prepolymer, a mixture of a TDI-type urethane prepolymer and hydrogenated MDI-type urethane prepolymer, or the like is preferable.

The "TDI-type urethane prepolymer", as used herein, means an isocyanate group-terminated urethane prepolymer resulting from the reaction between a TDI or a polyisocyanate compound comprising a TDI as a major component and a polyol (preferably polytetramethylene ether glycol). The "MDI-type urethane prepolymer", as used herein, means an isocyanate group-terminated urethane prepolymer resulting from the reaction between an MDI or a polyisocyanate compound comprising an MDI as a major component and a polyol (preferably polytetramethylene ether glycol). The "hydrogenated MDI-type urethane prepolymer", as used herein, means an isocyanate group-terminated urethane prepolymer resulting from the reaction between a hydrogenated MDI or a polyisocyanate compound comprising a hydrogenated MDI as a major component and a polyol (preferably polytetramethylene ether glycol).

Specific examples of the isocyanate group-terminated urethane prepolymer having a residual polyisocyanate monomer content of not more than 0.1% by mass include Adiprene LF900A and LF950A available from Uniroyal chemical.

The aromatic polyamine curing agent used in the present invention is a compound having at least two amino groups bonded to aromatic ring(s). Such a compound may be of a phenylenediamine type in which two or more amino groups are bonded to one aromatic ring or of a polyaminobenzene type that contains two or more aminophenyl groups in each of which one amino group is bonded to one aromatic ring. Polyaminobenzene-type compounds are preferable because they have less influence of amino groups upon each other or less influence of steric hindrance. Such a polyaminobenzene-type compound may be diaminobenzene in which two aminophenyl groups are directly bonded to each other or may be such that two aminophenyl groups are bonded to each other through a lower alkylene group or an alkylene oxide group. Among them, diaminodiphenylalkane having two aminophenyl groups bonded to each other through a lower alkylene group. Particularly preferable are 4,4'-diaminodiphenylmethane represented by the following general formula or derivatives thereof. In the case where the compound is of p-form and having a not very long molecular chain intervening between aminophenyl groups, benzene nuclei forming hard segments can be arranged side-by-side linearly on a plane and, hence, it is possible to efficiently make use of urethane bond, urea bond, hydrogen bond between benzene nuclei or intermolecular cohesive energy, thus resulting in improvements in repulsion property, tensile strength and tear strength. For this reason, a resulting cover tends to be improved in cover strength such as scuff resistance, and cover durability.

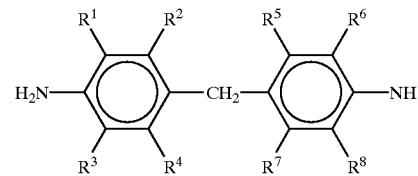

$R^1$ to $R^8$ each represent any one of an alkyl group having 1 to 9 carbon atoms, a halogen atom or a hydrogen atom.

Specific examples of such alkyl group having 1 to 9 carbon atoms include straight-chain alkyl groups such as methyl, ethyl, n-propyl, n-butyl, n-pentyl, n-hexyl, n-heptyl, n-octyl, and n-nonyl; branched-chain alkyl groups such as i-propyl, i-butyl, sec-butyl, t-butyl, and neopentyl; and alicyclic alkyl groups such as cyclopropyl and cyclohexyl. Among them, methyl and ethyl are preferable as they involve less steric hindrance. Examples of such halogen atoms include fluorine, chlorine, bromine, and iodine. Among them, chlorine and bromine are preferable. $R^1$ to $R^8$ may be different alkyl groups or different halogen atoms. Examples of derivatives of 4,4'-diaminodiphenylmethane include 3,3'-dichloro-4,4'-diaminodiphenylmethane, 3,3'-dimethyl-5,5'-diethyl-4,4'-diaminodiphenylmethane, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3'-dimethyl-5,5'-diisopropyl-4,4'-diaminodiphenylmethane, 3,3'-diethyl- 5,5'-diisopropyl-4,4'-diaminodiphenylmethane, 3,3'-dimethyl-5,5'-di-t-butyl-4,4'-diaminodiphenylmethane, 3,3'-dichloro-5,5'-diethyl-4,4'-diaminodiphenylmethane, 2,2'-dichloro-3,3',5,5'-tetraethyl-4,4'-diaminodiphenylmethane, and 2,2',3,3'-tetrachloro-4,4'-diaminodiphenylmethane. Among them, 2,2'-dichloro-3,3',5,5'-tetraethyl-4,4'-diaminodiphenylmethane is particularly preferable because its toxicity is low.

Though the amount of the aromatic polyamine curing agent in the composition used for the cover is not particularly limited, preferably the aromatic polyamine curing agent is blended with the isocyanate group-terminated urethane prepolymer so that the molar ratio of amino group of the polyamine respective to isocyanate group of the urethane prepolymer, namely NH2/NCO, is 0.85 to 1.15.

The composition used for the cover in the present invention may contain any conventionally known catalyst for use in a curing reaction between polyisocyanate and polyamine. Examples of such catalysts include monoamines such as triethylamine and N,N-dimethylcyclohexylamine; polyamines such as N,N,N',N'-tetramethylethylenediamine and N,N,N',N'',N''-pentamethyldiethylenetriamine; cyclic diamines such as 1,8-diazabicyclo[5,4,0]-7-undecene (DBU) and triethylenediamine; organic carboxylic acids such as azelaic acid, oleic acid, and adipic acid; and tin catalysts such as dibutyltin dilaurylate and dibutyltin diacetate. Among them, azelaic acid is preferably used. As required, the composition for cover may contain, in addition to the isocyanate group-terminated urethane prepolymer and the aromatic polyamine curing agent, a filler such as barium sulfate, a coloring agent such as titanium dioxide, and other additives such as a dispersant, antioxidant, ultraviolet absorber, light stabilizer, fluorescent material, and fluorescent brightener unless they impair any desired property to be imparted to an intended golf ball by a resulting cover.

With respect to the cover of the golf ball according to the present invention, the hardness of the cover material polyurethane alone (the hardness of the material itself may be referred to as "slab hardness") is preferably not less than 35, more preferably not less than 40, much more preferably not less than 43, in terms of Shore D hardness. If the hardness is less than 35, the resulting cover is so soft that a golf ball with this cover is easy to spin and hence exhibits a lowered repulsion property and that the cover exhibits too low a scuff resistance when hit with an iron or a sand wedge. Since a polyurethane having a higher slab hardness gives a harder cover, too high a slab hardness results in a golf ball which offers a harder shot feeling and which cannot ensure satisfactory controllability in approach shots due to the spin rate decreased too much. For this reason, the upper limit of the slab hardness (Shore D hardness) of the cover material polyurethane is preferably 60, more preferably 55, much more preferably 52.

The isocyanate group-terminated urethane prepolymer and the aromatic polyamine curing agent need to react in a state that they are homogeneously mixed. It is therefore preferable to mix the melted polyamine compound with the urethane prepolymer heated to a temperature close to the temperature of the melted polyamine, and inject the mixture into a mold heated to a temperature close to the mixing temperature.

Though the solid core used in the present invention may comprise a vulcanized rubber sphere conventionally used for the solid core of a multi-piece solid golf ball, a solid core having the following characteristics is preferably used in combination with the polyurethane cover used in the present invention.

That is, a preferable solid core has a diameter of from 39.0 to 41.8 mm and a difference of not less than 15 in Shore D hardness between the central point thereof and the surface thereof, and deforms from 2.80 to 4.00 mm by compression on condition that an initial load of 10 kgf is increased to an ultimate load of 130 kgf. With such a solid core having an increased diameter as large as 39.0 to 41.8 mm, a golf ball can make use of the repulsion property of the solid core. Further, by adjusting the difference in Shore D hardness between the central point and the surface of the solid core to 15 or more and the amount of compressive deformation of the solid core applied with a load varying from an initial load of 10 kgf to a final load of 130 kgf to fall within the range of from 2.80 to 4.00 mm, it is possible to obtain a golf ball that gives a lower impact to the golfer upon shot, imparts a softer shot feeling and exhibits higher repulsion.

As the diameter of the core grows larger, the proportion of the vulcanized rubber sphere in the golf ball increases. Hence, with a larger core it is easier to obtain a golf ball exhibiting high repulsion as well as to adjust the difference in hardness between the central point and the surface of the solid core to 15 or more. In view of this, the lower limit of the solid core diameter is preferably 39.6 mm, more preferably 40.0 mm. On the other hand, the upper limit of the solid core diameter is preferably 41.8 mm, more preferably 41.6 mm. If the solid core diameter is more than 41.8 mm, the cover needs to be made so thin that molding becomes difficult because the size of a golf ball is fixed according to the standards.

Further, by making the solid core soft at a central portion thereof and harder as it extends toward the surface thereof, it is possible to ensure a satisfactory repulsion property as well as to make the shot feeling soft. More specifically, the repulsion property of a golf ball tends to become higher as the difference in hardness between the central point and the surface of the solid core increases even if the amount of compressive deformation remains unchanged under the aforementioned load condition. In addition, since it is possible to increase the shot angle and decrease the spin rate in the initial stage of flight, a longer carry can be expected when the ball is hit with an iron in particular. For these reasons, the difference in Shore D hardness between the central point and the surface of the solid core is preferably not less than 15, more preferably not less than 18, much more preferably not less than 20. The upper limit of the difference in hardness is about 30 because of limitations in the manufacture and is preferably 28. Specifically, it is preferable that the Shore D hardness of the solid core falls within the range of from about 20 to about 40 at the central point thereof and within the range of from about 45 to about 65 at the surface point thereof while the difference in hardness between the two points of the solid core is not less than 15.

The amount of compressive deformation of the solid core applied with a load varying from 10 kgf as an initial load to 130 kgf as a final load, which serves an indication of the softness of the whole solid core, is preferably not less than 2.80 mm, more preferably not less than 2.90 mm. The upper limit of the amount of compressive deformation is preferably not more than 4.00 mm, more preferably not more than 3.80 mm, much more preferably 3.50 mm. When the amount of compressive deformation of the core is less than 2.80 mm, the core provides a golf ball imparting a hard shot feeling to golfers. When the amount of compressive deformation of the core is more than 4.00 mm, the core provides such a soft golf ball that the golfer feels the ball heavy.

The solid core used in the solid golf ball of the present invention may be any solid core which satisfies the foregoing requirements without any particular limitation, for example, a solid core made from vulcanized rubber used in a conventional solid golf ball.

A rubber composition for the solid core may be a rubber composition comprising a diene rubber such as butadiene rubber (BR), ethylene-propylene-diene terpolymer (EPDM), isoprene rubber (IR), styrene-butadiene rubber (SBR), or acrylonitrile-butadiene rubber (NBR); an unsaturated carboxylic acid and/or a metal salt thereof as a co-crosslinking agent; an organic peroxide as a crosslinking initiator; and optionally other additives such as a specific gravity adjustor.

Examples of the organic peroxides include dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferably used. The amount of the organic peroxide to be blended is preferably from 0.3 to 3.0 parts by mass, more preferably from 0.5 to 1.5 parts by mass, based on 100 parts by mass of the diene rubber.

A preferable unsaturated carboxylic acid is an a,β-unsaturated carboxylic acid having 3 to 8 carbon atoms such as an acrylic acid or a methacrylic acid. A preferable metal salt of the unsaturated carboxylic acid is a monovalent or bivalent metal salt such as a zinc salt or magnesium salt. The amount of the unsaturated carboxylic acid and/or a metal salt thereof is preferably from 20 to 50 parts by mass, particularly from 25 to 40 parts by mass, based on 100 parts by mass of the diene rubber.

The vulcanization conditions for the rubber composition are appropriately established depending on the formulation of the rubber composition. The rubber composition is preferably vulcanized at 160° C. to 180° C. for 10 to 25 minutes to produce a solid core satisfying the foregoing hardness conditions.

The solid golf ball of the present invention comprises the combination of the solid core and cover thus described. The solid golf ball is preferably a two-piece golf ball comprising a single-layered core, namely a vulcanized rubber sphere formed of a single rubber composition, and a polyurethane cover. The amount of compressive deformation of such a two-piece golf ball applied with a load varying from an initial load of 10 kgf to a final load of 130 kgf is preferably not less than 2.60 mm and not more than 3.50 mm, more preferably not less than 2.70 mm and not more than 3.30 mm, much more preferably not less than 2.80 mm and not more than 3.10 mm. By adjusting the amount of compressive deformation of the ball, which is equivalent to the cover hardness taking the hardness of the solid core and the like into account, so as to fall within the aforementioned range, it is possible to realize the best combination of solid core and polyurethane cover which imparts a soft shot feeling, exhibits a high repulsion property and secures a satisfactory spin rate.

The solid golf ball of the present invention may be manufactured by a process conventionally known as a process for manufacturing a golf ball covered with a hard polyurethane cover. Specifically, a cover composition is injected into a hemispherical mold holding therein the core and then the mold is inverted and jointed with another hemispherical mold into which a polyurethane cover composition has been injected, to form a golf ball with a polyurethane cover.

As required, the surface of the polyurethane cover is formed with a multiplicity of dimples during the molding of the cover. Further, the golf ball of the present invention is usually provided with paint finish, a marking stamp and the like to enhance the appearance and commercial value thereof before it is put on the market. It is to be noted that the cover of the golf ball of the present invention may comprise a single layer or plural layers.

EXAMPLES

Hereinafter, the present invention will be more specifically described by way of examples, which are, in no way, construed as limitative of the present invention.

Measurement and Evaluation Methods

1. Amount of Compressive Deformation (mm)

The amount of deformation of a core or a golf ball by compressing on condition that an initial load of 10 kgf was increased to an ultimate load of 130 kgf was measured.

2. Shore D Hardnesses of the Central Point and the Surface of a Core

Measurement was performed using a Shore D type spring hardness tester prescribed by ASTM-D2240.

The solid core was divided into two hemispherical halves and the hardness of one of the hemispherical halves was measured by pressing a pick against the central point of the halves. The hardness of the surface of the solid core was measured by pressing the pick against the surface of the solid core. The hardness of the surface of the core was measured by pressing the pick against the surface of the core.

3. Hardness of a Cured Product of a Cover Composition (Slab Hardness)

The composition prepared for a cover was formed into sheets each having a thickness of about 2 mm by hot press molding and the resulting sheets were conserved at 23° C. for two weeks. Three or more of the sheets were stacked on one another to prevent the substrate or the like used in the measurement from influencing the measurement and the stack was subjected to measurement using the Shore D type spring hardness tester prescribed by ASTM-D2240.

4. Repulsion Index

An aluminum cylindrical body having a weight of 200 g was allowed to impinge upon each golf ball at a velocity of 45 m/sec. The respective velocities of the cylindrical body and the golf ball before and after the impingement were measured, and the repulsion coefficient of the golf ball was calculated from the respective velocities thus measured and the respective weights of the cylindrical body and golf ball. The measurement was performed five times for each golf ball and the average of the measured values was calculated. The repulsion index of each golf ball was an indexed value relative to the repulsion coefficient of a golf ball having a conventional polyurethane cover (Comparative Example 1) being assumed 100. A greater index is indicative of a higher repulsion property.

5. Spin Rate (rpm) and Retention of the Spin Rate (%)

Each golf ball was hit with a sand wedge attached to a swing robot manufactured by True Temper Co. at a head speed of 20 m/sec. The spin rate of the golf ball thus hit was measured by taking a serial photograph of the golf ball.

The measurement of the spin rate of each golf ball was carried out under a dry condition (D) and a wet condition (W) both. The wet condition was a condition in which the ball wetted with water was hit with the club with its face wetted with water.

The retention of the spin rate of each golf ball was calculated from the following expression:

spin rate under wet condition/spin rate under dry condition×100.

6. Scuff Resistance

Two portions of a golf ball were each hit once using a commercially available pitching wedge attached to the swing robot at a head speed of 36 m/sec. The condition of each of the two portions thus hit was visually observed and rated into three categories according to the following criteria. The lower one of the two ratings was regarded as the rating of the golf ball.

Category "○": a ball surface with few flaws left to an unnoticeable degree.

Category "Δ": a ball surface with clearly noticeable flaws and with slight napping observed.

Category "X": a ball surface considerably shaved and conspicuously napped.

7. Shot Feeling

The impact strength or the sensation of repulsion imparted by a golf ball upon shot was evaluated according to the following rating criteria by an actual hitting test conducted by ten golfers using a metal head driver W#1. A rating category to which the largest number of golfers agreed for each golf ball was determined as the shot feeling of the golf ball.

Category "○": a golf ball giving a small impact or imparting a sensation of sufficient repulsion, hence imparting a good shot feeling;

Category "Δ": a golf ball giving an ordinary shot feeling; and

Category "X": a golf ball giving a large impact or imparting a sensation of heaviness, hence imparting a poor shot feeling. Manufacture of Golf Ball (1) Manufacture of Solid Core Rubber compositions of the formulation shown in Table 1 were subjected to a vulcanizing molding process under the vulcanizing conditions shown in Table 1, to give vulcanized rubber spheres of cores "a" to "g" each having a diameter of from 38.0 to 41.0 mm. The difference in hardness between the central point and the surface of each solid core thus obtained and the amount of compressive deformation of each solid core applied with a load varying from 10 to 130 kgf were measured. The results of the measurement were also shown in Table 1.

TABLE 1

|  |  | a | b | c | d | e | f | g |
|---|---|---|---|---|---|---|---|---|
| Core composition | Butadiene rubber | 100 | 100 | 100 | 100 | 100 | 100 | 100 |
|  | Zinc acrylate | 33 | 33 | 33 | 33 | 33 | 33 | 28 |
|  | Zinc white | 11.0 | 10.5 | 11.0 | 12.0 | 11.0 | 8.5 | 13.0 |
|  | Diphenyl disulfide | 0.5 | 0.5 | 0.5 | 0.5 | 0.5 | 0.5 | 0.5 |
|  | Dicumyl peroxide | 1.0 | 1.0 | 1.0 | 1.0 | 1.0 | 1.0 | 1.0 |
| Vulcanizing condition (° C. × min) |  | 160 × 20 | 170 × 15 | 170 × 15 | 170 × 15 | 140 × 20 165 × 8 | 160 × 20 | 170 × 15 |
| Core diameter |  | 40.4 | 39.8 | 40.4 | 41.0 | 40.4 | 38.0 | 40.4 |
| Difference of Shore D hardness |  | 19 | 24 | 26 | 28 | 3 | 16 | 19 |
| Amount of compressive deformation (mm) |  | 2.95 | 3.10 | 3.25 | 3.40 | 2.70 | 2.85 | 4.15 |

In Table 1, butadiene rubber is high-cis-polybutadiene BR-18 produced by JSR Corp. diphenyl disulfide is a product of Sumitomo Seika Chemicals, and dicumyl peroxide is a product of NOF Corp.

(2) Manufacture of Cover

Cover compositions "A" to "G" of the formulation shown in Table 2 were each cured about any one of solid cores "a" to "g" under the conditions shown in Table 2, to yield Example golf balls Nos. 1 to 12 shown in Table 3 and Comparative Example golf balls Nos. 1 to 7 shown in Table 4.

It should be noted that cover composition "H" began curing during mixing the urethane prepolymer with the curing agent, making the molding of a cover impossible.

TABLE 2

| Cover composition |  | A | B | C | D | E | F | G | H |
|---|---|---|---|---|---|---|---|---|---|
| Urethane prepolymer | Adiprene LF900A | 100 | 50 | — | — | — | — | 50 | — |
|  | Adiprene LF950A | — | 50 | — | — | — | — | 50 | — |
|  | Adiprene LF330 | — | — | 100 | — | — | — | — | — |
|  | Vibrathane B635 | — | — | — | 50 | — | — | — | 50 |
|  | Vibrathane B670 | — | — | — | 50 | — | — | — | 50 |

TABLE 2-continued

| Cover composition | | A | B | C | D | E | F | G | H |
|---|---|---|---|---|---|---|---|---|---|
| Curing agent | Lonzacure M-CDEA | 15.8 | 20.9 | 27.7 | — | — | — | — | 40.5 |
| | Versalink P-250 | — | — | — | 48.3 | — | — | 24.8 | — |
| Elastmer | Pandex T1198 | — | — | — | — | 100 | — | — | — |
| Ionomer | Himilan 1605 | — | — | — | — | — | 50 | — | — |
| | Surlyn 9320 | — | — | — | — | — | 50 | — | — |
| Titanium oxide | | 2 | 2 | 2 | 2 | 2 | 2 | 2 | 2 |
| Curing time (min) | | 10 | 10 | 10 | 10 | — | — | 20 | — |
| Mold temperature (° C.) | | 120 | 120 | 120 | 120 | — | — | 120 | — |
| Prepolymer temperature (° C.) | | 80 | 80 | 80 | 80 | — | — | 80 | 80 |
| Curing agent temperature (° C.) | | 120 | 120 | 120 | 120 | — | — | 120 | 120 |
| Slab hardness (Shore D) | | 42 | 47 | 55 | 52 | 53 | 50 | 45 | — |

In Table 2, Adiprene LF900A is a TDI(NCO content=3.7%)-PTMG type prepolymer having a free TDI content of not more than 0.1% produced by Uniroyal chemical; Adiprene LF950A is a TDI(NCO content=6.1%)-PTMG type prepolymer having a free TDI content of not more than 0.1% produced by Uniroyal chemical; Adiprene LF330 is a TDI (NCO content=6.48%)-PTMG type prepolymer having a free TDI content of not more than 0.1% produced by Uniroyal chemical; Vibrathane B635 is a MDI(NCO content=7.8%)-PTMG type prepolymer having a free MDI content of more than 0.1% produced by Uniroyal chemical; Vibrathane B670 is a MDI(NCO content=11.2%)-PTMG type prepolymer having a free MDI content of more than 0.1% produced by Uniroyal chemical; Lonzacure M-CDEA is 4,4'-methylenebis(3-chloro-2,6-diethylaniline) having an amine value of 297 mgKOH/g produced by Uniroyal chemical; Versalink P-250 is polytetramethylene oxide aminobenzoate having an amine value of 249.4 mgKOH/g produced by Air Products Co.; Pandex T1198 is an adipate type thermoplastic polyurethane elastomer produced by Dainippon Ink & Chemicals; Himilan 1605 is a sodium ion-neutralized ethylene-methacrylic acid type ionomer resin produced by Mitsui-DuPont Polychemical Kabushiki Kaisha; and Surlyn 9320 is a zinc ion-neutralized ethylene-methacrylic acid-n-butyl acrylate type ionomer resin produced by E. I. DuPont Co.

Each of the golf balls was evaluated as to amount of compressive deformation, repulsion index, spin rate, retention of spin rate, scuff resistance, and shot feeling. The results of the evaluation are shown in Tables 3 and 4.

TABLE 3

| | Example No. | 1 | 2 | 3 | 4 | 5 | 6 | 7 | 8 | 9 | 10 | 11 | 12 |
|---|---|---|---|---|---|---|---|---|---|---|---|---|---|
| Core | Composition | a | a | b | c | c | c | d | e | f | f | g | c |
| | Diameter (mm) | 40.4 | 40.4 | 39.8 | 40.4 | 40.4 | 40.4 | 41.0 | 40.4 | 38.0 | 38.0 | 40.4 | 40.4 |
| | Amount of deformation (mm) | 2.95 | 2.95 | 3.10 | 3.25 | 3.25 | 3.25 | 3.40 | 2.70 | 2.85 | 2.85 | 4.15 | 2.95 |
| | Difference in hardness | 19 | 19 | 24 | 26 | 26 | 26 | 28 | 3 | 16 | 16 | 19 | 19 |
| Cover | Composition | A | C | B | A | B | C | B | A | B | C | A | G |
| | Slab hardness | 42 | 55 | 47 | 42 | 47 | 55 | 47 | 42 | 47 | 55 | 42 | 45 |
| | Thickness (mm) | 1.2 | 1.2 | 1.5 | 1.2 | 1.2 | 1.2 | 0.9 | 1.2 | 2.4 | 2.4 | 1.2 | 1.2 |
| Ball | Amount of deformation (mm) | 3.00 | 2.70 | 3.00 | 3.30 | 3.15 | 2.95 | 3.35 | 2.75 | 2.70 | 2.50 | 4.2 | 2.95 |
| | Repulsion index | 101 | 104 | 101 | 102 | 103 | 104 | 103 | 103 | 100 | 103 | 98 | 102 |
| | Spin rate (D) | 7500 | 6900 | 7100 | 7050 | 7000 | 6950 | 6900 | 7600 | 7300 | 6700 | 6900 | 7300 |
| | Spin rate (W) | 3300 | 2900 | 3200 | 3100 | 3100 | 2950 | 3000 | 2800 | 3100 | 2800 | 3100 | 3200 |
| | Retention of spin rate (%) | 44 | 42 | 45 | 44 | 44 | 42 | 43 | 37 | 42 | 42 | 45 | 44 |
| | Scuff resistance | ◯ | ◯ | ◯ | ◯ | ◯ | ◯ | ◯ | ◯ | ◯ | ◯ | ◯ | Δ |
| | Shot feeling | ◯ | ◯ | ◯ | ◯ | ◯ | ◯ | ◯ | Δ | Δ | Δ | Δ | ◯ |

TABLE 4

| | Comparative Example No. | 1 | 2 | 3 | 4 | 5 | 6 | 7 |
|---|---|---|---|---|---|---|---|---|
| Core | Composition | c | c | c | f | f | e | g |
| | Diameter (mm) | 40.4 | 40.4 | 40.4 | 38.0 | 38.0 | 40.4 | 40.4 |
| | Amount of deformation (mm) | 3.00 | 3.05 | 3.10 | 2.65 | 2.80 | 2.50 | 3.95 |

TABLE 4-continued

|  |  | Comparative Example No. | | | | | | |
|---|---|---|---|---|---|---|---|---|
|  |  | 1 | 2 | 3 | 4 | 5 | 6 | 7 |
|  | Difference in hardness | 26 | 26 | 26 | 19 | 19 | 3 | 24 |
| Cover | Composition | D | E | F | E | F | E | E |
|  | Slab hardness | 52 | 53 | 50 | 53 | 50 | 53 | 53 |
|  | Thickness (mm) | 1.2 | 1.2 | 1.2 | 2.4 | 2.4 | 1.2 | 1.2 |
| Ball | Amount of deformation (mm) | 3.00 | 3.05 | 3.10 | 2.65 | 2.80 | 2.50 | 3.95 |
|  | Repulsion index | 100 | 99 | 98 | 97 | 97 | 100 | 96 |
|  | Spin rate (D) | 7000 | 7200 | 7300 | 7400 | 7200 | 7600 | 7000 |
|  | Spin rate (W) | 2800 | 2400 | 2200 | 2500 | 2150 | 2500 | 2300 |
|  | Retention of spin rate (%) | 40 | 33 | 30 | 34 | 30 | 33 | 33 |
|  | Scuff resistance | Δ | Δ | X | Δ | X | Δ | X |
|  | Shot feeling | ○ | Δ | Δ | Δ | Δ | X | X |

Comparative Example golf balls Nos. 3 and 5 each having cover (F) made from a mixture of a hard ionomer and a soft ionomer imparted a shot feeling rated "Δ" but were inferior in retention of spin rate and scuff resistance. Further, these golf balls were inferior in repulsion property though the amount of compressive deformation thereof was comparable to that of each Example golf ball.

Any one of Comparative Example golf balls Nos. 2, 4, 6 and 7 each having cover (E) made from an elastomer exhibited a low retention of spin rate and was inferior in repulsion property, scuff resistance and shot feeling. In particular, Comparative Example golf ball No. 6 having core "e" of which the amount of core compressive deformation was small exhibited a small ball compressive deformation amount and hence imparted a hard and inferior shot feeling. Comparative Example golf ball No. 4 having core "f" with a small diameter had a relatively thick elastomer cover and hence exhibited an inferior repulsion property. Comparative Example golf ball No. 7 having core "g" of which the amount of core compressive deformation was large imparted a sensation of heaviness and hence imparted a particularly poor shot feeling while exhibiting a lowered repulsion property due to its compression too large.

Comparative Example golf ball No. 1 having a cover (D) made from polyurethane using a urethane prepolymer having a residual isocyanate monomer content of more than 0.1% by mass was improved in repulsion property and shot feeling as compared with a golf ball having a cover made from a mixture of ionomers or an elastomer but exhibited an unsatisfactory scuff resistance.

On the other hand, any one of Example golf balls Nos. 1 to 12 each having a cover made from polyurethane using a urethane prepolymer having a residual polyisocyanate monomer content of not more than 0.1% by mass exhibited a high retention of spin rate and a satisfactory scuff resistance while keeping its repulsion property at a level comparable to or higher than that of a conventional polyurethane-covered ball (i.e. Comparative Example No. 1).

Among the Example golf balls each having a cover made from polyurethane using a urethane prepolymer having a residual polyisocyanate monomer content of less than 0.1%, the golf ball (Example No. 8) comprising the combination of this cover with a core having a relatively small difference in hardness between the central point and the surface thereof, specifically core "e" that was relatively hard, exhibited a lowered retention of spin rate due to a decreased spin rate under the wet condition and imparted a relatively hard shot feeling. The golf balls (Examples Nos. 9 and 10) each comprising the combination of the cover with core "f" having a relatively small diameter were inferior in repulsion index to Example No. 2 (cover "C") and Examples Nos. 3, 5 and 7 (cover "B") having respective covers formed of the same materials as those of Examples Nos. 9 and 10. Further, since the shot feeling of these golf balls became more susceptible to the influence of the respective covers, Example No. 10 having cover "C" that was relatively hard tended to impart a relatively hard shot feeling, while Example No. 9 having cover "B" that was relatively soft tended to impart a relatively heavy shot feeling. The golf ball (Example golf ball No. 11) comprising the combination of the cover "A" with core "g" of which the amount of compressive deformation was large as a whole relative to the difference in hardness between the central point and the surface thereof exhibited a lowered repulsion property and imparted a sensation of heaviness because the amount of deformation of the ball was also relatively large. The golf ball (Example golf ball No. 12) having a cover "G" made from Versalink P-250 having a long molecular chain intervening between aminophenyl groups as a curing agent with respect to the urethane prepolymer tended to exhibit an inferior scuff resistance as compared with other Example golf balls Nos. 1 to 11 each using Lonzacure M-CDEA having an intervening molecular chain composed of a methylene group.

The solid golf ball of the present invention uses an isocyanate group-terminated urethane prepolymer having a residual polyisocyanate monomer content of not more than 0.1% by mass as a material of its polyurethane cover. The material using the urethane prepolymer may provide a high quality polyurethane cover and, hence, the golf ball with this cover is excellent in scuff resistance and is capable of ensuring a required spin rate whether it is hit under a dry condition or a wet condition.

Further, by combining the polyurethane cover with a solid core having appropriate hardness and diameter it is possible to realize a golf ball having an enhanced repulsion property and ensuring an improved shot feeling rather than a conventional polyurethane-covered golf ball.

This application is based on Japanese Application Serial No. 2000-402501 filed in Japanese Patent Office on Dec. 28, 2000, the contents of which are hereby incorporated by reference.

While only certain preferred embodiments of the present invention have been described in detail, as will be apparent for those skilled in the art, certain changes and modifications may be made in embodiment without departing from the spirit and scope of the present invention as defined by the following claims.

What is claimed is:

1. A solid golf ball comprising:
    a solid core; and
    a cover covering the solid core,
        wherein the solid core has a diameter of from 39.0 to 41.8 mm and deforms from 2.80 to 4.00 mm by compression on condition that an initial load of 10 kgf is increased to an ultimate load of 130 kgf;
        the difference in Shore D hardness between the central point and the surface point of the solid core being not less than 15;
        the cover is made from polyurethane obtained by curing a composition comprising an isocyanate group-terminated urethane prepolymer and an aromatic polyamine compound; and
        the isocyanate group-terminated urethane prepolymer is one selected from the group consisting of a TDI-polyol type urethane prepolymer, a MDI-polyol type urethane prepolymer and a hydrogenated MDI-polyol type urethane prepolymer and has a residual polyisocyanpte monomer content of not more than 0.1% by mass; and the polyol is one selected from the group consisting of a polytetramethylene ether glycol, a polyester polyol, a lactone polyester polyol, a polycarbonate diol and an acrylic polyol.

2. The solid golf ball according to claim 1, wherein the aromatic polyamine compound is 4,4'-diaminodiphenylmethane represented by the formula:

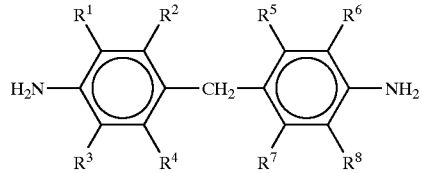

where $R^1$ to $R^8$ each represents any one of an alkyl group having 1 to 9 carbon atoms, a halogen atom and a hydrogen atom.

3. The solid golf ball according to claim 2, wherein the aromatic polyamine compound is 2,2'-dichloro-3,3'5,5'-tetraethyl-4,4'-diaminodiphenylmethane.

4. The solid golf ball according to claim 1, which is a two-piece golf ball having the solid core consisting of a single layer, wherein the golf ball deforms from 2.60 to 3.50 mm by compression on condition that an initial load of 10 kgf is increased to an ultimate load of 130 kgf.

5. The solid golf ball according to claim 1, wherein the polyurethane has a Shore D hardness of from 35 to 60.

6. The solid golf ball according to claim 1, wherein the polyol is polytetramethylene ether glycol.

7. The solid golf ball according to claim 6, wherein the aromatic polyamine compound is 4,4'-diaminodiphenylmethane represented by the formula:

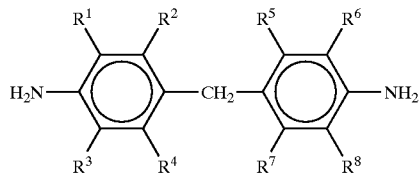

where $R^1$ to $R^8$ each represents any one of an alkyl group having 1 to 9 carbon atoms, a halogen and a hydrogen atom.

8. The solid golf ball according to claim 7, wherein the aromatic polyamine compound is 2,2'-dichloro-3,3', 5,5'-tetraethyl-4,4'-diaminodiphenylmethane.

9. The solid golf ball according to claim 6, wherein the polyurethane has a Shore D hardness of from 35 to 60.

10. The solid golf ball according to claim 6, which is a two-piece golf ball having the solid core consisting of a single layer, wherein the golf ball deforms from 2.60 to 3.50 mm by compression on condition that an initial load of 10 kgf is increased to an ultimate load of 130 kgf.

* * * * *